(12) United States Patent
Gaskin et al.

(10) Patent No.: US 11,110,389 B2
(45) Date of Patent: Sep. 7, 2021

(54) LIGHT GAS SEPARATION FROM HYDROCARBONS FOR VARIABLE COMPOSITION FEED STREAMS

(71) Applicant: BRECOR HOLDINGS LLC, Wilmington, DE (US)

(72) Inventors: Thomas K. Gaskin, Spring, TX (US); Earle R. Mowrey, Houston, TX (US)

(73) Assignee: BRECOR HOLDINGS LLC, Wilmington, DE (US)

(*) Notice: Subject to any disclaimer, the term of this patent is extended or adjusted under 35 U.S.C. 154(b) by 0 days.

(21) Appl. No.: 17/121,738

(22) Filed: Dec. 14, 2020

(65) Prior Publication Data

US 2021/0093994 A1 Apr. 1, 2021

Related U.S. Application Data

(63) Continuation of application No. 16/588,923, filed on Sep. 30, 2019, now Pat. No. 10,864,476, which is a
(Continued)

(51) Int. Cl.
*B01D 53/00* (2006.01)
*B01D 53/14* (2006.01)

(52) U.S. Cl.
CPC ..... *B01D 53/1418* (2013.01); *B01D 53/1425* (2013.01); *B01D 2252/205* (2013.01);
(Continued)

(58) Field of Classification Search
CPC .... C07C 7/11; C07C 9/04; C10L 3/10; B01D 53/14; B01D 53/1493; C01B 2203/0415; C01B 2203/0495; C01B 3/52
See application file for complete search history.

(56) References Cited

U.S. PATENT DOCUMENTS 2,781,293 A 2/1957 Ragatz
2,907,409 A 10/1959 Koble
(Continued)

OTHER PUBLICATIONS

International Search Report and The Written Opinion of the International Searching Authority for International Application No. PCT/US2011/031220, dated Jun. 14, 2011, 6 pages.

*Primary Examiner* — Sharon Pregler
(74) *Attorney, Agent, or Firm* — Polsinelli PC

(57) ABSTRACT

The invention is a process and apparatus for separating the components of a multi-component gas stream comprising light and heavier volatility components with a variable composition. The process includes contacting the multi-component gas stream with a lean solvent in an absorber to produce a light component overhead stream and a rich solvent bottoms stream, flashing the rich solvent bottoms stream in at least a first, second and third reduced constant pressure of sequentially lower pressure wherein the released gas is compressed and a part is routed back to the absorber bottoms as stripping gas and a part is routed as a part of the heavier product stream. In this invention compressed vapor from the first or second reduced constant pressure rich solvent flash vessel is split by flow control between recycle routing to the absorber bottom stage as stripping gas and to the heavier product hydrocarbon stream, depending on the feed gas concentration of light component. The third and any additional flash vessels at sequentially lower pressure produce flash gas that is the remainder of the produced hydrocarbon product stream. The lean solvent remaining after the lowest pressure flash is routed back to the top of the absorber.

16 Claims, 2 Drawing Sheets

Related U.S. Application Data continuation of application No. 13/634,058, filed as application No. PCT/US2011/031220 on Apr. 5, 2011, now Pat. No. 10,427,092.

(60) Provisional application No. 61/320,897, filed on Apr. 5, 2010.

(52) U.S. Cl.
CPC ...... *B01D 2256/16* (2013.01); *B01D 2256/24* (2013.01); *B01D 2257/102* (2013.01); *B01D 2257/702* (2013.01)

(56) References Cited

U.S. PATENT DOCUMENTS

| | | | |
|---|---|---|---|
| 4,421,535 A * | 12/1983 | Mehra | C07C 7/11 62/625 |
| 4,623,371 A | 11/1986 | Mehra | |
| 4,680,042 A | 7/1987 | Mehra | |
| 4,740,222 A | 4/1988 | Mehra | |
| 4,832,718 A | 5/1989 | Mehra | |
| 4,883,514 A | 11/1989 | Mehra | |
| 5,224,350 A | 7/1993 | Mehra | |
| 5,325,672 A | 7/1994 | Forte | |
| 5,462,583 A * | 10/1995 | Wood | B01D 53/14 585/809 |
| 5,551,972 A | 9/1996 | Wood et al. | |
| 6,698,237 B2 | 3/2004 | Gaskin | |
| 7,337,631 B2 | 3/2008 | Gaskin | |
| 7,442,847 B2 | 10/2008 | Gaskin | |
| 7,563,307 B2 | 7/2009 | Gaskin | |
| 2008/0256977 A1 | 10/2008 | Mowrey et al. | |

\* cited by examiner

LIGHT GAS SEPARATION FROM HYDROCARBONS FOR VARIABLE COMPOSITION FEED STREAMS

CROSS-REFERENCE TO RELATED APPLICATIONS

This application is a continuation of U.S. patent application Ser. No. 16/588,923 filed on Sep. 30, 2019, which is a continuation of Ser. No. 13/634,058 filed Sep. 11, 2012, which is a national stage application of PCT/US11/031220 filed Apr. 5, 2011, which claims the benefit of 61/320,897 filed Apr. 5, 2010, wherein each of the aforementioned applications is expressly incorporated herein by reference, in its entirety, without disclaimer.

FIELD OF THE INVENTION

The invention relates to the field of chemical processing and, more specifically, to the processing of hydrocarbon gas streams. In particular, a method and apparatus for separating the components of a hydrocarbon gas stream with variable composition is disclosed.

BACKGROUND OF THE INVENTION

Many hydrocarbon gases such as natural gas, coal mine and coal seam gases, landfill gases, refinery operation off-gases and hydroprocessing recycle loop gases contain one or more light components that either contaminate the main gas or that are themselves more valuable if they can be separated from the main gas stream. Such light gases include nitrogen and hydrogen. A number of economic considerations make it desirable to separate these light gases from a hydrocarbon gas stream.

Absorption using a physical solvent to remove the heavier hydrocarbon components and therefore separate them from the light components can be employed. This process is described in several patents, including U.S. Pat. Nos. 4,623,371, 4,680,042, 4,740,222, 4,832,718, 4,883,514, 5,224,350, 5,325,672, 5,462,583, 5,551,972, 6,698,237 B2, 7,337,631 B2, 7,442,847 B2, and 7,563,307 B2 along with U.S. patent application Ser. No. 12/082,976, all which are incorporated by reference herein in their entirety. These patents describe absorption/flash regeneration systems for removal of light components such as nitrogen or hydrogen from heavier components such as methane or ethylene. In most of the referenced prior art, the feed gas and the lean solvent stream are chilled to between 0° F. (−17.7° C.) and −40° F. (−40° C.) to enhance recovery of the heavier components and to reduce contamination of the light component stream with heavier components, including solvent components. The absorber may operate at a wide range of pressures, typically 200 psig (13.8 barg) or higher. The last flash used to release the recovered heavier components from the rich solvent is operated at low pressure to minimize the concentration of absorbed heavier components in the lean solvent.

In these processes the heavier components are absorbed away from the light components using a circulating physical solvent. Reducing the pressure of the rich solvent in one or more flash separators releases the heavier absorbed component and regenerates the solvent for recirculation to the absorber. These patents address systems wherein the physical solvent used is external, meaning a made up of component(s) added to the system (U.S. Pat. Nos. 4,623,371, 4,680,042, 4,740,222, 4,832,718, 4,883,514) and also systems wherein the physical solvent used is internally generated and is therefore composed of heaviest component(s) in the feed gas (U.S. Pat. Nos. 5,462,583 and 5,551,972). Controlling the amount of light components in the rich solvent affects the recovery of the light component and the purity of the absorbed and released heavier component. In some applications, the vapor released from the first flash vessel is recycled to the bottom of the absorber as stripping gas, effectively reducing the amount of light component in the heavier component product released from the rich solvent in later flash vessels (U.S. Pat. Nos. 4,740,222, 4,832,718, 5,462,583, 5,551,972). Using this method, lowering the pressure of the first flash vessel will result in a less light component in the heavy product. This first flash pressure must be lower when the amount of light component in the feed is higher in order to maintain a similar heavier component purity. The amount of light component absorbed and released with the heavier component product can alternatively be controlled by recycle of heavy component product to the bottom of the absorber as stripping gas (U.S. Pat. No. 5,325,672), or with a reboiler on the absorber bottoms. When heavy component recycle is used, more recycle results in a purer heavy component, and a higher rate of recycle is required to maintain heavy product purity when the feed gas contains more light component.

A specification for the concentration of light component in the heavy component product can be controlled over a wide range of feed gas compositions using either the heavy product recycle method or the first flash vapor recycle method. However, a design to accommodate a low amount of light component in the feed, and also perform with a high concentration results in design of each piece of equipment to handle the worst case load of the two operations required. An improvement to the process that results in improved flexibility to accommodate changes in feed composition and improved operability while minimizing or even reducing associated system cost and complexity is needed.

SUMMARY OF THE INVENTION

An object of this invention is to improve operability and flexibility in an absorption separation process wherein the feed gas stream will vary in composition. Surprisingly, the inventive method developed to increase operability and flexibility has also resulted in a significant reduction in energy consumption and in total installed cost, with the power required by the conventional process requiring 44% more installed gas recompression horsepower.

A preferred embodiment of the invention is a process and apparatus for separating the components of a multi-component gas stream comprising light and heavier volatility components with a variable composition. The process includes contacting the multi-component gas stream with a lean solvent in an absorber to produce a light component overhead stream and a rich solvent bottoms stream, flashing the rich solvent bottoms stream in at least a first, a second, and a third reduced constant pressure stages of sequentially lower pressure wherein the released gas is compressed by a compressor dedicated to the service and a part is routed back to the absorber bottoms as stripping gas and a part is routed as a part of the heavier product stream. In this embodiment compressed vapor from the first or second rich solvent flash vessel is split by flow control between recycle routing to the absorber bottom stage as stripping gas and to the heavier product hydrocarbon stream, depending on the feed gas concentration of light component. The third and any additional flash vessels at sequentially reduced constant pressure produce flash gas that is the remainder of the produced hydrocarbon product stream. The lean solvent remaining after the lowest pressure flash is routed back to the top of the absorber.

Improved embodiments include the following items. When the flash gas rate from the first constant reduced pressure flash vessel is not enough to produce required purity heavy hydrocarbon product gas, a part of the gas from the second constant reduced pressure flash vessel is also routed to the absorber bottoms stage. When only part of the flash gas from the first flash vessel is required for the product specification to be met, the remainder of gas from the first flash is routed to the hydrocarbon product, and all of the gas from the second flash is also routed to the heavy hydrocarbon product. The flash gas from the first flash vessel is compressed with the same compressor which is dedicated to this service regardless of where the compressed gas is routed. The gas from the second constant reduced pressure flash vessel is also compressed in a compressor dedicated to the service regardless of where the compressed gas is routed.

The following are additional improved embodiments. The absorber may operate at a pressure from 200 to 3000 psia (13.8 to 207 bara), and the flash vessels may operate, each at a sequentially lower constant pressure, in a range of from 2800 psia (193 bara) for the highest pressure flash to 7 psia (0.48 bara) for the lowest pressure flash vessel. Each flash vessel typically has an operating pressure that is from 20 to 75% of the pressure of the preceding vessel. The temperature in the absorber and the flash vessels may range from ambient down to 20° F. (−6.7° C.), or as low as −40° F. (−40° C.) when the system streams are cooled with refrigeration. The rate of flash gas routed to the absorber is controlled, and may be adjusted as needed to meet product purity. Flash vessel pressures are constant, and constant pressure can be maintained by control of flash gas routed to the hydrocarbon product.

The novel arrangement of this invention allows improved control of the process when there are variations in feed compositions, while surprisingly also reducing energy consumption. These objects, features, and advantages will be apparent in the following drawings, descriptions and examples

DETAILED DESCRIPTION OF PREFERRED EMBODIMENTS

An object of this invention is to improve operability and flexibility in an absorption separation process wherein the feed gas stream will vary in composition. Surprisingly, the method developed to increase operability and flexibility has also resulted in a 31% decrease in gas recompression installed horsepower and a 24% decrease in worst case gas recompression operating horsepower as compared to a conventional process.

The invention is a process and apparatus for separating the components of a multi-component gas stream comprising light and heavier volatility components with a variable composition. The process includes contacting the multi-component gas stream with a lean solvent in an absorber to produce a light component overhead stream and a rich solvent bottoms stream, flashing the rich solvent bottoms stream in at least three reduced constant pressure stages of sequentially lower pressure wherein the released gas is compressed and a part is routed back to the absorber bottoms as stripping gas and a part is routed as a portion of the heavier product stream. In this embodiment compressed vapor from the first or second rich solvent flash vessel is split by flow control between routing to the absorber bottom stage as stripping gas and to the heavier product hydrocarbon stream, depending on the feed gas concentration of light component. The third and any additional flash vessels at sequentially lower pressure produce flash gas that is the remainder of the produced hydrocarbon product stream. The lean solvent remaining after the lowest pressure flash is routed back to the top of the absorber.

In order to present the unique advantages and benefits of the new process, a review of conventional technology is provided.

COMPARATIVE EXAMPLE 1

Conventional technology will be described through the use of a feed gas containing the light component nitrogen, along with acid gases and hydrocarbons, wherein the feed composition of nitrogen is expected to increase from an initial composition of 24% nitrogen to a final composition of 54% nitrogen over a period of time. The produced hydrocarbon product is to be at the same pressure as the inlet gas, contain less than 2% molar nitrogen, and recover close to all of the hydrocarbon content of the feed gas. This is a realistic example for a gas reservoir with a nitrogen cap added for pressure maintenance.

Figure 1:
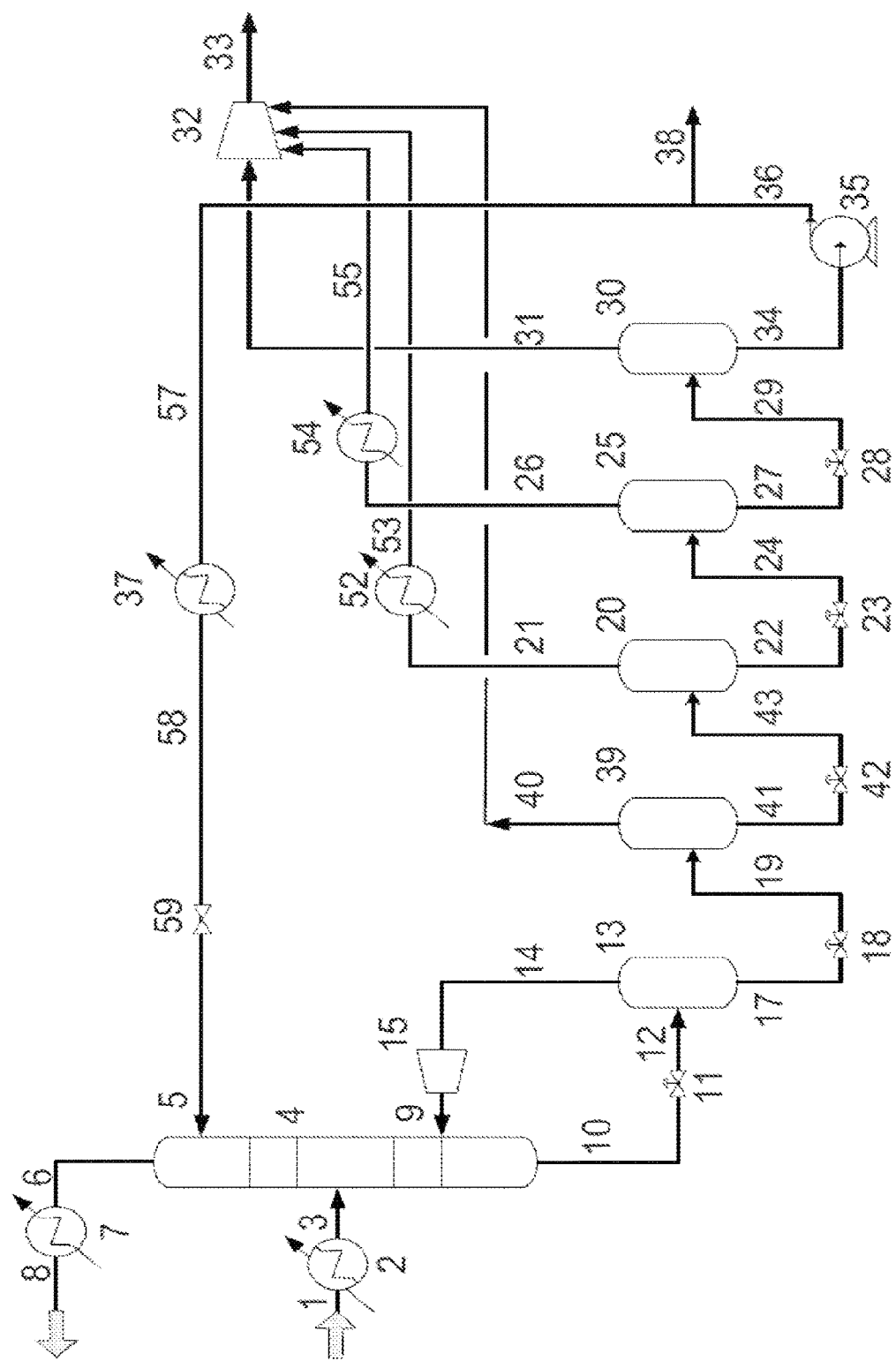
FIG. 1 depicts a conventional (comparative) process for separating the components of a gas stream using lean oil absorption with flash regeneration of the solvent and with first flash vapor recycled to the absorber as stripping gas.

Referring to FIG. 1, the overall material balance and conditions for the 24% nitrogen feed case are as follows:

TABLE 1

|  | Feed Gas - Stream 1 | Light, N2 - Stream 8 | Heavy, Hydrocarbon- Stream 56 | Excess Solvent - Stream 38 |
| --- | --- | --- | --- | --- |
| Pressure, psia (bara) | 1067 (73.6) | 1015 (70.0) | 1067 (73.6) | 141 (9.7) |
| Temperature, ° F. (° C.) | 120 (48.9) | 110 (43.3) | 124 (51.1) | 125 (51.7) |
| Flow, lb (kg) Mol/hr | 5490 (2490) | 1291 (585.6) | 4166 (1890) | 32.5 (14.7) |
| Composition, Mol Fraction |  |  |  |  |

TABLE 1-continued

|  | Feed Gas - Stream 1 | Light, N2 - Stream 8 | Heavy, Hydrocarbon- Stream 56 | Excess Solvent - Stream 38 |
|---|---|---|---|---|
| N2 | .2400 | .9725 | .0148 | .0000 |
| CO2 | .0056 | .0004 | .0072 | .0000 |
| H2S | .0001 | .0000 | .0002 | .0000 |
| C1 | .6290 | .0139 | .8247 | .0000 |
| C2 | .0866 | .0083 | .1116 | .0001 |
| C3 | .0207 | .0028 | .0264 | .0030 |
| iC4 | .0029 | .0004 | .0035 | .0102 |
| nC4 | .0063 | .0010 | .0075 | .0523 |
| iC5 | .0016 | .0002 | .0015 | .0560 |
| nC5 | .0015 | .0002 | .0013 | .0734 |
| nC6 | .0030 | .0002 | .0012 | .3381 |
| nC7 | .0017 | .0000 | .0002 | .2404 |
| nC8 | .0007 | .0000 | .0000 | .1287 |
| nC9 | .0004 | .0000 | .0000 | .0749 |
| nC10 | .0001 | .0000 | .0000 | .0230 |

The feed gas 1 is cooled to −25° F. (−31.7° C.) in exchangers 2 and fed as stream 3 to an intermediate point in absorber 4. Cooling for exchangers 2 is provided by reheat of cold streams in exchangers 7, 54 and 52 in parallel and lastly from a propane refrigerant chiller. Lean solvent stream 5 enters the top of the absorber, thereby contacting the feed gas as it rises, and purified nitrogen-rich stream 6 exits the top at −24° F. (−31.1° C.), is reheated in exchanger 7 and leaves the system as stream 8 at close to inlet pressure and temperature. Rich solvent in the absorber below the inlet gas feed point is in contact with stripping gas 9, and the rich solvent leaves the bottom of the absorber as stream 10 at 1021 psia (70.4 bara) and 7° F. (−14° C. Stream 10 is reduced in pressure by control valve 11, and enters flash vessel 13 as stream 12 at 513 psia (35.4 bara) and −2° F. (−19° C.). Some of the inlet nitrogen was absorbed into the rich solvent, along with the hydrocarbons. This flash vessel pressure allows release of enough of the absorbed nitrogen so that in the remaining sequential flashes the total released vapor will meet a sales specification of <2% nitrogen content. The vapor from the first flash, stream 14, is compressed in compressor 15 and enters the bottom of the absorber as stream 9. This not only provides stripping gas to the absorber, but also removes of the nitrogen from the rich solvent. The remaining flash vessels 39, 20, 25, and 30 operate at lower pressures of 260, 190, 87 and 16 psia (17.9, 13.1, 6.9 and 1.1 bara) respectively. Control valves 18, 42, 23 and 28 provide both level control for the flash vessels and provide the pressure drop to release more of the absorbed hydrocarbons and the small amount of remaining nitrogen from the solvent. The vapor released from the flash vessels 39, 20, 25, and 30 are streams 40, 21, 26 and 31 comprise the heavy hydrocarbon product stream after they have been reheated in exchangers 52 and 54, and recompressed in multistage compressor 32, exiting as the hydrocarbon product stream 33. Stream 34 is the regenerated lean solvent leaving the last flash vessel. This solvent enters pump 35, leaving as stream 36 at slightly above absorber operating pressure. Any excess solvent is withdrawn as stream 38, and remaining lean solvent 57 is then chilled in exchanger 37 using propane refrigeration to exit as stream 58 at a temperature of −25° F. (−31.7° C.), and then 58 passing through flow control valve 59, leaving as stream 5 and entering the absorber. The pressure of the last flash vessel 30 determines how pure the lean solvent is. The rate of solvent 5 controls the amount of hydrocarbon remaining in the nitrogen stream 8, and the pressure of the first flash vessel 13 controls the amount of nitrogen in the hydrocarbon product. As the inlet gas contains a significant amount of hydrocarbons heavier than methane, the solvent is made up of the heavier components of the solvent that do not vaporize in the flash vessels. This is referred to as an internal solvent. Excess solvent is created continuously by the process, and is withdrawn as stream 38. It is not indicated in FIG. 1, but in this example the excess solvent was further stabilized in a small stripping tower with released overhead lighter components routed to compressor 32, and the stabilized solvent bottoms product leaving the system, and indicated as stream 38 in the material balance above. Note that air coolers are used on compressor discharges as required, and also on the solvent leaving the stabilizer, although these are not shown. Additional control points are also not indicated.

For this 24% nitrogen feed example, critical equipment loads are listed in the following table:

TABLE 2

| Equipment | Horsepower (KW) | Flow, lb-moles/hr (kg-moles/hr) |
|---|---|---|
| Compressor 32 | 5612 (4186) | 4166 (1890) |
| Compressor 15 | 1264 (943) | 3835 (1740) |
| Refrigeration compressor (*) | 3507 (2616) | 3397 (1541) |
| Pump 35 | 2537 (1893) | 12440 (9280) |

(*) Refrigeration compressor not shown in FIG. 1

COMPARATIVE EXAMPLE 2

To complete review of conventional design performance, an alternative case is evaluated. In the alternative scenario, the feed gas composition may increase to a maximum for 54% nitrogen, and in this example this alternative feed, and all in between 24% and 54%, must be processed by the same facility. The sales purity specification of <2% nitrogen is unchanged, and the inlet and outlet pressures and the feed gas flow rate are also unchanged. To accommodate this high nitrogen content feed, two changes are made in the operation: the first flash vessel pressure is decreased from 513 psia to 265 psia (35.4 to 18.3 bare) and the lean solvent rate is increased. The reduction in first flash pressure increases the amount of stripping gas routed back to the bottom stage of the absorber so that the hydrocarbon product stream 33 will meet the purity specification. The increase in solvent rate is required to maintain purity of the light component stream 8. The operating pressure in the remaining flash vessels 39, 20, 25, and 30 is the same as in Comparative Example 1. Solvent pump 35 horsepower increases in proportion to the 50% increase flow. The refrigeration requirement of the process increases by 25%. Critical equipment loads for the 24% nitrogen and the 54% nitrogen cases are presented in Table 3.

pression requirement changes affect the energy consumption and the capital cost of the process. Compression for the highest load case must be installed for the process to operate as required. Although the total of compression services 32 and 15 is 6,876 horsepower (5129 KW) for the 24% nitrogen case and 9,382 (6999 KW) for the 54% nitrogen case, the total actual installed horsepower would have to be 10,387 (7749 KW).

TABLE 3

|  | 24% Nitrogen Case | | 54% Nitrogen Case | |
| --- | --- | --- | --- | --- |
| Equipment | Horsepower (KW) | Flow, lb-moles/hr (kg-moles/hr) | Horsepower (KW) | Flow, lb-moles/hr (kg-moles/hr) |
| Compressor 32 | 5612 (4186) | 4166 (1890) | 4607 (3437) | 2474 (1122) |
| Compressor 15 | 1264 (943) | 3835 (1740) | 4775 (3562) | 6504 (2950) |
| Refrigeration compressor (*) | 3507 (2616) | 3397 (1541) | 4408 (3288) | 4266 (1935) |
| Pump 35 | 2537 (1893) | 12440 (9280) | 3808 (2837) | 16750 (7598) |

(*) Refrigeration compressor not shown in FIG. 1

Purity of the heavy hydrocarbon product stream and the light product nitrogen stream with 54% nitrogen are nearly identical to the product purity in the 24% nitrogen feed gas case, so the objective of the process is met. However, the change in pressure of the first flash creates practical problems. Absorber 4 pressure remains constant at 1021 psia (70.4 bara) and the second flash vessel pressure remains constant at 264 psia (18.2 bara). With the first flash pressure change from 513 psia (35.4 bara) in Comparative Example 1 to 265 psia (18.3 bara), level control valve 11 between the absorber and the first flash pressure has a differential pressure change from 508 psi to 756 psi (35.0 to 52.1 bar). The differential pressure through level control valve 18 between the first and second flash vessels changes from 249 psi to 1 psi (17.2 to 0.07 bar). There is almost no flow of vapor from the third flash vessel 20. The third flash pressure must be reduced to allow adequate pressure drop through valve 18 to maintain proper control of level in the vessels. The control of the flash vessel levels is more difficult in the 54% case. Pressure in the flash vessels is controlled by the flow through the compressors, withdrawing the vapor from the flashes. Control of the flash vessel pressure is also more difficult, as the flash vessel vapor compressor loads of flow and suction pressure are so different from the 24% N2 case. The com-

EXAMPLE 3

Figure 2:
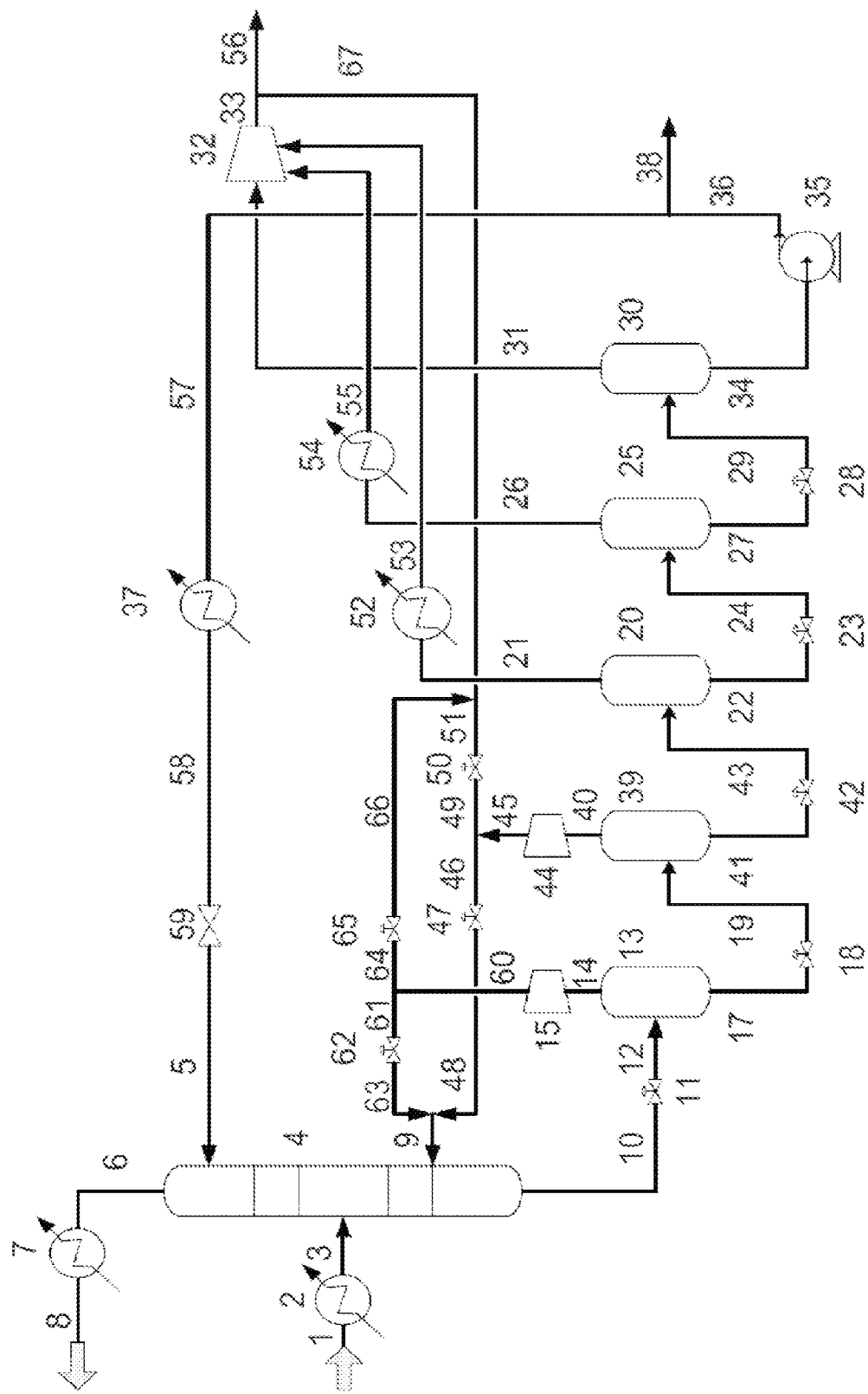
FIG. 2 depicts a novel process for separating the components of a gas stream using lean oil absorption with flash recycle of stripping gas and flash regeneration of the solvent according to this invention wherein the process includes the capability to split the compressed flash gas with the first part of the gas being routed to the absorber bottom stage for stripping and the second part being routed to the heavy hydrocarbon product, in order to improve control and operability when the feed gas composition changes. An unexpected benefit is a significant reduction in energy consumption and installed compressor horsepower.

The process of the present invention is shown in FIG. 2.

The process of FIG. 2 was developed to address the problems of level and pressure control in the conventional process which can affect operability. The objective is to have the flash vessels operate at constant preset pressure even when the inlet gas composition changes. This would result in the level control valves between the flash vessels always having the same pressure drop available. Constant flash vessel pressure would also result in flash vessel vapor compressors always having the same suction pressure and compression ratio from suction to discharge. The method used to solve the control problems has had the unexpected and very beneficial result of significantly decreasing energy consumption and capital cost.

The process of FIG. 2 will be described using the design feed range of compositions, conditions, and produced product specifications as were used to describe the conventional technology, thereby allowing comparison of results. Referring to FIG. 2, the overall material balance and conditions for a 37% nitrogen feed case are as follows:

TABLE 4

|  | Feed Gas - Stream 1 | Light, N2 - Stream 8 | Heavy, Hydrocarbon- Stream 56 | Excess Solvent - Stream 38 |
| --- | --- | --- | --- | --- |
| Pressure, psia (bara) | 1067 (73.6) | 1015 (70.7) | 1067 (73.6) | 141 (9.7) |
| Temperature, ° F. (C.) | 120 (48.9) | 110 (43.3) | 125 (51.7) | 125 (51.7) |
| Flow, lb-moles/hr (kg-moles/hr) | 5490 (2490) | 2074 (941) | 3397 (1541) | 18.8 (8.53) |
| Composition, Mol Fraction |  |  |  |  |
| N2 | .3762 | .9719 | .0146 | .0000 |
| CO2 | .0034 | .0002 | .0052 | .0000 |
| H2S | .0001 | .0000 | .0002 | .0000 |
| C1 | .5246 | .0176 | .8372 | .0000 |
| C2 | .0694 | .0067 | .1082 | .0002 |
| C3 | .0138 | .0018 | .0212 | .0067 |
| iC4 | .0019 | .0003 | .0028 | .0119 |
| nC4 | .0042 | .0006 | .0061 | .0480 |
| iC5 | .0010 | .0002 | .0013 | .0393 |
| nC5 | .0010 | .0002 | .0013 | .0577 |

TABLE 4-continued

|     | Feed Gas - Stream 1 | Light, N2 - Stream 8 | Heavy, Hydrocarbon- Stream 56 | Excess Solvent - Stream 38 |
| --- | --- | --- | --- | --- |
| nC6 | .0020 | .0002 | .0015 | .3237 |
| nC7 | .0012 | .0000 | .0003 | .2648 |
| nC8 | .0006 | .0000 | .0000 | .1446 |
| nC9 | .0003 | .0000 | .0000 | .0781 |
| nC10 | .0001 | .0000 | .0000 | .0253 |

The feed gas 1 is cooled to −25° F. (−31.7° C.) in exchangers 2 and fed as stream 3 to an intermediate point in absorber 4. Cooling for exchangers 2 is provided by reheat of cold streams in exchangers 7, 54 and 52 in parallel and lastly from a propane refrigerant chiller. Lean solvent stream 5 enters the top of the absorber, thereby contacting the feed gas as it rises, and purified nitrogen-rich stream 6 exits the top at −24° F. (−31.1° C.), is reheated in exchanger 7 and leaves the system as stream 8 at close to inlet pressure and temperature. Rich solvent in the absorber below the inlet gas feed point is in contact with stripping gas 9, and the rich solvent leaves the bottom of the absorber as stream 10 at 1021 psia (70.4 bara) and 6° F. (−14.4° C.). Stream 10 is reduced in pressure by control valve 11, and enters flash vessel 13 as stream 12 at a first constant reduced pressure of 513 psia (35.4 bara) and −1° F. (−18.3° C.). Some of the inlet nitrogen was absorbed into the rich solvent, along with the hydrocarbons. This flash vessel will release part of the nitrogen absorbed. The vapor from the first flash, stream 14, is compressed in dedicated to service compressor 15 exiting as stream 60 and flows as stream 61 through valve 62, and as stream 63 is mixed with any flow in stream 48 to then enter the absorber bottom stage as stream 9. This not only provides stripping gas to the absorber, but also removes of the nitrogen from the rich solvent. In this example, valve 65 is closed and there is no flow in streams 64 and 66. The remaining flash vessels 39, 20, 25, and 30 operate at constant lower pressures of 260, 190, 87 and 16 psia (17.9, 13.1, 6.0 and 1.1 bara) respectively. Control valves 18, 42, 23 and 28 provide both level control for the flash vessels and provide the pressure drop to release more of the absorbed hydrocarbons and the small amount of remaining nitrogen from the solvent. The vapor released from the second flash vessel, 39, is routed through dedicated compressor 44, exiting as stream 45. A part of stream 45 flows as stream 46 through flow control valve 47, exiting as stream 48 and joining stream 63 to enter the absorber as steam 9. The reminder of stream 45 flows though control valve 50 and is routed to become part of the heavy hydrocarbon product stream 56. In this example about 48% of stream 45 is routed through valve 47 to the absorber with a flow rate of 955 lb-moles/hr (433 kg-moles/hr). This vapor provides the additional stripping in the absorber and additional nitrogen removal from vapor to produce a required purity of the produced hydrocarbon product. Control valve 50 can be used to control constant pressure in the second flash vessel. Control valve 65 would be used to control pressure in the first flash vessel when the flow is split, with part on flow control to the absorber and part on pressure control to the hydrocarbon product. The hydrocarbon product streams released from the flash vessels 20 and 25 are reheated in exchangers 52 and 54 against inlet gas, and are compressed to product pressure by compressor 32, as is the vapor from the last flash vessel, stream 31. Stream 34 is the regenerated lean solvent leaving the last flash vessel. This solvent enters pump 35, leaving as stream 36 at slightly above absorber operating pressure. Any excess solvent is withdrawn as stream 38, and remaining lean solvent 57 is then chilled in exchanger 37 using propane refrigeration to exit as stream 58 at a temperature of −25° F. (−31.7° C.), and then 58 passing through flow control valve 59, leaving as stream 5 and entering the absorber. The pressure of the last flash vessel 30 determines how pure the lean solvent is. The rate of solvent 5 controls the amount of hydrocarbon remaining in the nitrogen stream 8. The total flow of recycled gas from flash vessels 13 and 39 controls the amount of nitrogen in the hydrocarbon product. As the inlet gas contains a significant amount of hydrocarbons heavier than methane, the solvent is made up of the heavier components of the solvent that do not vaporize in the flash vessels. This is referred to as an internal solvent. Excess solvent is created continuously by the process, and is withdrawn as stream 38. It is not indicated in FIG. 1, but in this example the excess solvent was further stabilized in a small stripping tower with released overhead lighter components routed to compressor 32, and the stabilized solvent bottoms product leaving the system, and indicated as stream 38 in the material balance above. Note that air coolers are used on compressor discharges as required, and also on the solvent leaving the stabilizer, although these are not shown. Additional control points are also not indicated.

For this 37% nitrogen feed example, critical equipment loads are listed in the following table:

TABLE 5

| Equipment | Horsepower (KW) | Flow, lb-moles/hr (kg-moles/hr) | Duty, MMbtu/hr (MM kcal/hr) |
| --- | --- | --- | --- |
| Compressor 32 | 4339 (3237) | 2317 (1051) | |
| Compressor 44 | 1507 (1124) | 2038 (924) | |
| Compressor 15 | 1314 (980) | 3948 (1791) | |
| Refrigeration compressor (*) | 3837 (2862) | 3717 (1686) | |
| Pump 35 | 2998 (2237) | 14120 (6405) | |
| Exchanger 52 | | | .623 (0.157) |
| Exchanger 54 | | | 1.01 (0.255) |
| Exchanger 7 | | | 2.26 (0.570) |
| Exchanger 37 | | | 8.32 (2.10) |
| Feed Chiller | | | 5.90 (1.49) |

(*) Refrigeration compressor is not shown in FIG. 2

In this improved process, the flash vessels are all held at constant pressure. The rate of flash gas routed back to the absorber bottoms stage is now adjusted by control valves 62 and 47. If the nitrogen content of a feed gas were to increase over time, starting with a low amount of nitrogen, the desired purity of the hydrocarbon product would be maintained by increasing the amount of flash gas routed to the absorber bottoms stage by initially increasing the amount of gas flowing through valve 62 until all of the gas from the first constant pressure flash is routed to the absorber, and none is left to flow to the hydrocarbon product stream. As the inlet nitrogen content increased more, valve 47 would be used to increase the flow of flash gas to the absorber as required. This use of flow control allows for continuous adjustment of flash gas across a very large range without having any affect on the pressure of the flash vessels or on the compression ratio of the flash gas compressors. This is made possible by use of dedicated compressor 44, in addition to the flash vapor control valves 62, 65, 47 and 50. In the conventional design, the service of compressor 44 was included in compressor 32.

This improved process can be used for feed compositions in the range of the 24% and 54% compositions as used in the examples for the conventional process. For about 24% nitrogen in the feed, there is minimal flow of first constant pressure flash 13 vapor to the hydrocarbon product through valve 65 with the vast majority being routed through valve 62. None of the vapor from the second constant pressure flash flows through valve 47 to the absorber bottoms, and all flows through valve 50 to the hydrocarbon product. With a nearly 54% feed gas nitrogen content, all if the vapor from the first flash would be routed to the absorber, and the vast majority of the vapor from the second flash would be routed to the absorber bottoms also, with only a minimal amount being routed through valve 50 to the hydrocarbon product.

Performance with close to 54% nitrogen feed case is shown in the following table:

TABLE 6

| Equipment | Horsepower (KW) | Flow, lb-moles/hr (kg-moles/hr) | Duty, MMbtu/hr MM kcal/hr) |
|---|---|---|---|
| Compressor 32 | 4367 (3258) | 2477 (1124) | |
| Compressor 44 | 1500 (1119) | 2038 (924) | |
| Compressor 15 | 1261 (941) | 3656 (1658) | |
| Refrigeration compressor | 4367 (3258) | 4229 (1918) | |
| Pump 35 | 3805 (2839) | 16750 (7598) | |
| Exchanger 52 | | | 0.66 (0.17) |
| Exchanger 54 | | | 0.98 (0.25) |
| Exchanger 7 | | | 3.26 (0.822) |
| Exchanger 37 | | | 12.3 (3.07) |
| Feed Chiller | | | 3.91 (0.985) |

Performance with close to 24% nitrogen feed gas case is shown in the following table:

TABLE 7

| Equipment | Horsepower (KW) | Flow, lb-moles/hr kg-moles/hr) | Duty, MMbtu/hr (MM kcal/hr) |
|---|---|---|---|
| Compressor 32 | 4206 (3138) | 2246 (1019) | |
| Compressor 44 | 1406 (1049) | 1920 (871) | |
| Compressor 15 | 1264 (943) | 3835 (1740) | |
| Refrigeration compressor | 3507 (2616) | 3397 (1541) | |
| Pump 35 | 2537 (1893) | 12440 (9280) | |

TABLE 7-continued

| Equipment | Horsepower (KW) | Flow, lb-moles/hr kg-moles/hr) | Duty, MMbtu/hr (MM kcal/hr) |
|---|---|---|---|
| Exchanger 52 | | | 0.60 (0.15) |
| Exchanger 54 | | | 1.00 (0.25) |
| Exchanger 7 | | | 1.42 (0.378) |
| Exchanger 37 | | | 4.89 (1.23) |
| Feed Chiller | | | 8.14 (2.05) |

The following table combines the horsepower of the compressors for the three feed cases for the present invention provided above, and also including the results from a case with 12% nitrogen in the inlet gas and meeting the same light nitrogen stream and hydrocarbon product stream compositions. For the 12% nitrogen feed case, the vapor from the first constant pressure flash is split to the absorber and to the hydrocarbon product and all of the vapor from the second flash is routed to the hydrocarbon product:

TABLE 8

| Equipment | Worst Case Load, Each HP (KW) | 12% Nitrogen HP (KW) | ~24% Nitrogen HP (KW) | ~37% Nitrogen HP (KW) | ~54% Nitrogen HP (KW) |
|---|---|---|---|---|---|
| Compressor 32 | 4367 (3258) | 3795 (2831) | 4206 (3138) | 4339 (3237) | 4367 (3258) |
| Compressor 44 | 1507 (1124) | 1236 (922) | 1406 (1049) | 1507 (1124) | 1500 (1119) |
| Compressor 15 | 1314 (980) | 1181 (881) | 1264 (943) | 1314 (980) | 1261 (941) |
| Total | 7188 (5362) | 6212 (4634) | 6876 (5130) | 7160 (5341) | 7128 (5318) |
| Refrigeration | | 3408 (5242) | 3507 (2616) | 3837 (2862) | 4367 (3258) |
| Pump 35 | | 1947 (1452) | 2537 (1893) | 2998 (2237) | 3805 (2839) |

The performance presented in Table 8 shows a remarkable consistency in the compressor loads for the gas recompression and recycle to the absorber services, compressors 32, 44 and 15. The worst case of each service totals only 7188 horsepower (5362 KW). Using the conventional (comparative) technology the worst case total was 10,387 horsepower (7749 KW) installed for gas compression, an increase of 44% above the present invention. The highest operating horsepower for any case was also much higher using the conventional technology, 9,382 (6999 KW) compared to 7,160 (5341 KW) with the present invention, a 31% increase. Compressors 32, 44 and 15 are nearly completely utilized in all cases. Heat exchangers 52 and 54, recovering energy from the flash vessel vapor, are also extremely consistent in the amount of energy recovered in all cases when used with the present invention. These benefits are in addition to the original goal of increasing operability by holding the pressure in the flash vessels constant, made possible by using flow control of flash gas vapor recycle to the absorber bottoms rater than varying the pressure.

The variation in equipment requirements would be far greater if the design did not use this invention; specifically, if it did not offer a flash vessel with a dedicated compressor for the flash vapor, with capability to route this vapor to the bottom of the absorber, the hydrocarbon product stream, or part of the stream both. Control and design is also greatly aided by holding operating pressures constant in the facility regardless of feed composition.

The disclosed invention is useful for nitrogen rejection from hydrocarbon streams and also to purify hydrogen contaminated with hydrocarbons, although it is not limited to these applications and may be used for separation of one or more higher volatility components from one or more lower volatility components. The solvent used may be made up of heavier components in the feed gas, made of external components added to the system, or a combination of both. The stripping gas to the bottom of the absorber may be augmented by recycle of a portion of the hydrocarbon product gas, or by adding heat to a reboiler at the bottom of the absorber. Additional exchangers for heat integration may be included, such as at the suction of first and second flash vapor compressors. Additional systems may be added to this invention to stabilize the excess solvent, to further purify the light component product by additional expansion, heat exchange, adsorption, or membrane processing, or to recover additional hydrocarbon liquid product by additional chilling, absorption, or expansion of the product hydrocarbon stream, and the recovered liquid may be used as a separate product or as a means of maintaining solvent inventory. Control systems may be any combination of level, pressure and flow, including multivariable control to best maintain a stable operation that can accommodate changes in feed flow, composition, or pressure, along with any desired changes in the facility operating parameters. The first constant reduced pressure flash vessel compressed vapor may be controlled with flow control on the stream to the absorber bottoms, adjusted to ensure the hydrocarbon product does not contain too much of the light component. If there is additional flow available from the first flash, it would be routed to the hydrocarbon product by the first flash pressure control valve, 65. When all of the first flash vapor is routed to the absorber and none to the hydrocarbon product, the pressure in the first flash could then be maintained by using the pressure control to control valve 62 to the absorber as valve 65 would be closed and pressure control is required. Obviously there are many choices for the combination of flow control and pressure control, including controls of the compressor and not using valves. There are similar choices for control of the vapor from the second flash vessel. Although the disclosed invention examples use refrigerant chilling of the feed gas and the solvent to −25° F. (−31.7° C.), this temperature may vary according to the application, with temperatures from as warm as +20° F. (−6.7° C.) and as cold as −40° F. (−40° C.) foreseen with refrigeration, even colder temperatures if expansion of the feed gas is utilized, or as high as ambient temperature is refrigeration is not utilized.

All of the methods and apparatus disclosed herein can be made and executed without undue experimentation in light of the present disclosure. While the methods of this invention have been described in terms of specific embodiments, it will be apparent to those of skill in the art that variations may be applied to the methods and apparatus and in the steps or in the sequence of steps of the methods described herein without departing from the concept, spirit and scope of the invention. All such similar substitutes and modifications apparent to those skilled in the art are deemed to be within the spirit, scope, and concept of the invention as defined by the following claims.

What is claimed is:

1. A system comprising:
   an absorber in which a multi-component feed gas stream is contacted with a lean solvent to produce a light overhead stream and a rich solvent bottoms stream;
   a first flash vessel at a first constant pressure which receives the rich solvent bottoms stream to produce a vapor and a remaining rich solvent;
   a flow control which controls a split of the vapor from the first flash vessel between a bottoms stage of the absorber and a produced hydrocarbon product stream;
   a second flash vessel at a second constant pressure which receives the remaining rich solvent from the first flash vessel and produces a second vapor and a second remaining rich solvent;
   one or more second flow controls which control a split of the vapor from the second flash vessel between the bottoms stage of the absorber and the produced hydrocarbon product stream; and
   a recycle stream from the second flash vessel or one or more downstream flash vessels from the second flash vessel to the absorber.

2. The system of claim 1, wherein the flow control routes all of the produced vapor from the first flash vessel to the absorber bottoms stage and the one or more second flow controls route a part of the produced vapor from the second flash vessel to the absorber bottom stage.

3. The system of claim 1, wherein the flow control routes a part of the produced vapor from the first flash vessel to the absorber bottoms stage and the one or more second flow controls route none of the produced vapor from the second flash vessel to the absorber bottom stage.

4. The system of claim 1, wherein the flow control routes a majority of the produced vapor from the first flash vessel to the absorber bottoms stage and the one or more second flow controls route none of the produced vapor from the second flash vessel to the absorber bottom stage.

5. The system of claim 1, further comprising a compressor between the first flash vessel and the first flow control.

6. The system of claim 1, further comprising a compressor between the second flash vessel and the second flow control.

7. The system of claim 1, wherein the flow control routes all of the vapor from the second flash vessel to the produced hydrocarbon product stream and none to the absorber.

8. The system of claim 1, wherein the one or more second flow controls route a portion of the vapor from the second flash vessel to the absorber bottom stage and the remaining is routed to produced hydrocarbon product stream.

9. The system of claim 1, wherein all, none, or part of the vapor from the second flash vessel is routed to the hydrocarbon product stream with the remaining vapor from the second flash vessel routed to the absorber bottom stage.

10. The system of claim 1, wherein all, none, or part of the vapor from the second flash vessel is routed the absorber bottom stage with the remaining vapor from the second flash vessel routed to the produced hydrocarbon product stream.

11. The system of claim 1, wherein the absorber is operated at a pressure between 200 psia and 3000 psia (13.8 and 207 bara).

12. The system of claim 1, wherein the flash vessels are operated at a pressure between 2800 psia and 7 psia (193 and 0.48 bara) with each successive vessel operating at a pressure lower than the preceding vessel.

13. The system of claim 1, wherein the multi-component feed gas stream comprises nitrogen and hydrocarbon.

14. The system of claim 1, wherein the nitrogen is present in the multi-component feed gas stream from 24% to 54%.

15. The system of claim 1, wherein the pressure in the first flash vessel is maintained the same across a range of nitrogen present in the multi-component feed gas stream at a concentration from 24% to 54%.

16. The system of claim 1, wherein the produced hydrocarbon product stream contains less than 2% nitrogen.

* * * * *